May 3, 1949.                H. C. SCHWARTZ                2,468,783
              METHOD AND MEANS FOR CONNECTING COAXIAL CABLES
                           Filed May 23, 1945
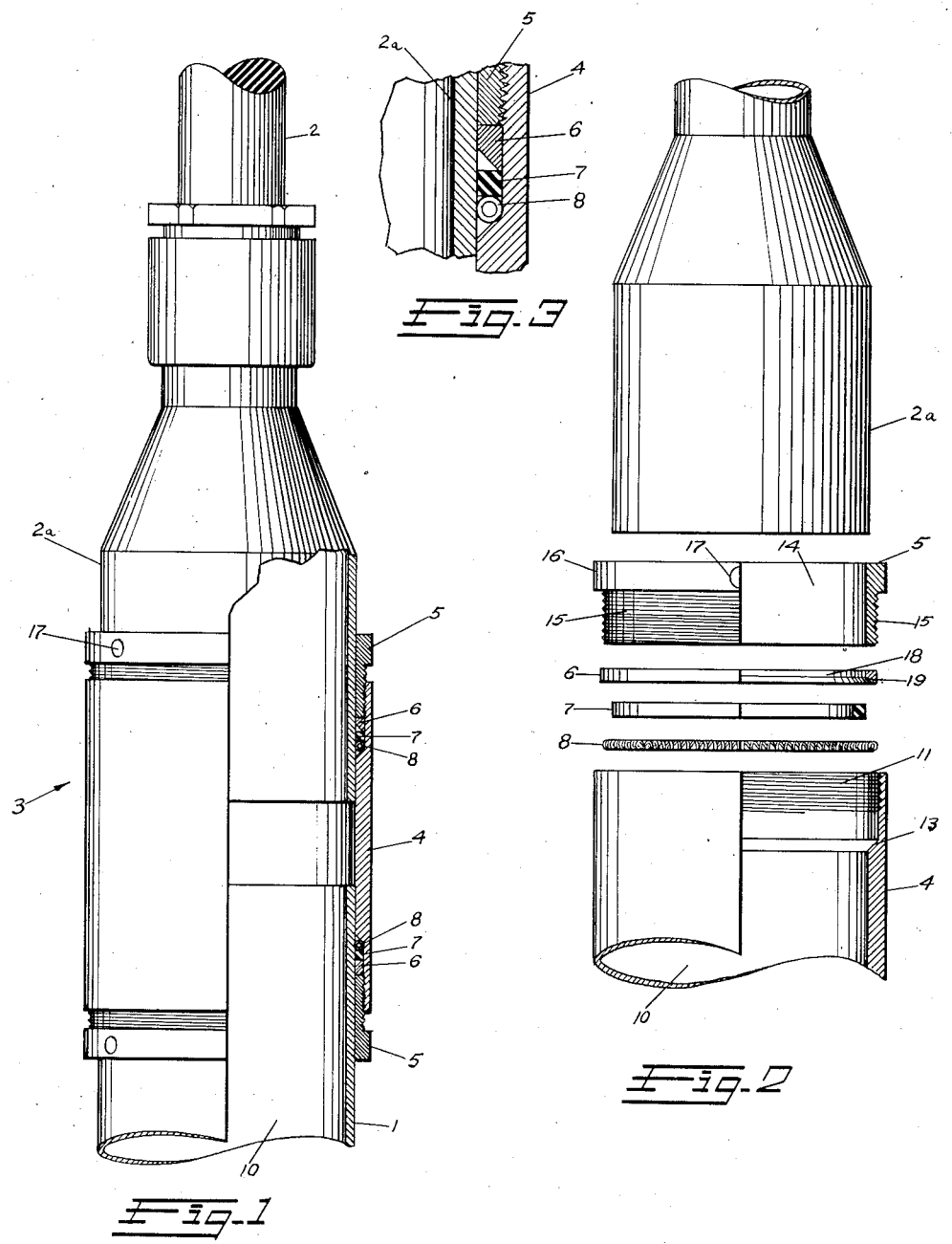
INVENTOR.
Herman C. Schwartz
BY
Ralph L Chappell
ATTORNEY Patented May 3, 1949

2,468,783

UNITED STATES PATENT OFFICE 2,468,783

METHOD AND MEANS FOR CONNECTING COAXIAL CABLES

Herman C. Schwartz, New Milford, N. J.

Application May 23, 1945, Serial No. 595,378

2 Claims. (Cl. 174—21)

(Granted under the act of March 3, 1883, as amended April 30, 1928; 370 O. G. 757)

This invention relates to means for coupling coaxial transmission lines of the type employed in radio-frequency, high-frequency or ultra-high-frequency transmission.

The object of this invention is to provide a coupling device for mechanically and electrically connecting together a pair of coaxial transmission lines.

Another object is to provide a connecting device for coaxial transmission lines that maintains the gastight integrity of the transmission lines.

A further object is to provide a coupling device that can be used selectively to connect a pair of rigid coaxial lines, a pair of flexible coaxial lines or a rigid line to a flexible coaxial line.

Another object is to provide a connecting device for coaxial transmission lines that is light in weight, small in size and that does not require soldering, brazing, the use of special tools or skilled labor in assembly.

It is also an object to provide a connecting device for coaxial transmission lines that permits rapid repair or replacement in the event of a casualty to the transmission line.

Further objects and advantages of this invention, as well as its construction, arrangement and operation, will be apparent from the following description and claims in connection with the accompanying drawing, in which, Fig. 1 is a side elevation, partly in section, of the coupling device with the parts in assembled relation.

Fig. 2 is an exploded view of the coupling device of Figure 1.

Fig. 3 is an enlarged sectional view showing in detail the cooperating elements comprising the air seal and electrical bonding spring.

There is shown, in Fig. 1, a standard air-filled coaxial line 1 coupled to a standard flexible coaxial transmission line designated as 2 by means of the coupling device generally designated 3, comprising this invention. The flexible coaxial line 2 is equipped with a sleeve adapter 2a to facilitate coupling.

As shown in Figs. 1 and 2 of the drawing, the coupling device comprises a coupling body 4, a pair of similar clamping or locking devices or gland nuts 5—5, a pair of similar bearing rings or gland washers 6—6 and pairs of gas impervious seals 7—7 and electrical bonding springs 8—8.

The coupling body 4 as shown in Figs. 1 and 2 consists of a cylindrical sleeve having a central bore or cavity 10. Each end of the coupling body is counterbored to provide a threaded recess 11 (Fig. 2) which terminates in a tapered seat or shoulder 13.

The clamping or locking devices or gland nuts 5, a shown in Fig. 2, each consists of a cylindrical shell having a central bore 14, the diameter of which is the same as that of the bore 10 of the coupling 4. The sleeve is externally threaded as at 15 and has a flange 16 in which there is provided a plurality of radially spaced wrench holes 17.

The bearing rings or gland washers 6 each consists of an annular ring having a central bore 18 and a tapered counterbore forming an annular seat 19.

The gas seals 7 each consists of a flexible resilient ring made of an elastic resilient gas-impervious material such as rubber.

The electrical bonding spring or resilient conducting gasket as shown in Fig. 2 comprises a circular torus of cylindrical, helically wound spring wire made of any suitable resilient electrical conducting material such as Phosphor bronze, for example.

It will be seen that the internal diameters of the coupling body 4, the gland nuts 5, the rings 6, the seals 7 and springs 8 comprising the connecting device 3 form a cavity adapted to receive slidably the bodies of the adapter 2a of coaxial line 2 and air coaxial line 1 respectively. The air or gas seals 7 and grounding springs 8, being expansible or elastic, frictionally engage the outside surfaces of the adapter 2a and coaxial line conductor 1 respectively.

Fig. 2 shows all the elements comprising the connecting device in their respective relative positions prior to assembly. Each of the members to be joined, for example the air coaxial line 1 and the adapter 2a, receives the clamping device or gland nut 5, the bearing member or gland washer 6, the gas seal 7 and the resilient conducting gasket comprising the grounding spring 8, in the order named. The bearing members 6 are mounted with their tapered seating surfaces facing each other, and engaging the resilient gas seals 7.

Assembly is accomplished by slipping the clamping device or gland nut 5, bearing member or gland washer 6, gas seal 7 and bonding spring 8, in the order named on the outside diameter of each coaxial line to be joined. The coaxial lines 1 and 2a are then slipped into opposite ends of the coupling body 4 and each clamping member or gland nut 5 tightened until the parts are locked against sliding.

As illustrated in the enlarged sectional view of

Fig. 3, the gas seal 7 is nested between the tapered seat 19 on the bearing member or gland washer 6 and the tapered seat 13 on the coupling body 4. The illustration shows the position of these parts prior to tightening of the clamping or locking device or gland nut 5. When the gland nut or clamping device 5 is screwed down the pressure of the tapered seat 19 deforms the air seal 7 forcing it tightly against the inner surface of the coupling body 4 and the wall of the adapter 2a of coaxial line 2. Similarly, the resilient bonding spring 8 is wedged between the coaxial line and the coupling body. An identical wedging or clamping action occurs between the air coaxial 1 and the sleeve 4.

There is thus obtained an intimate engagement between the parts being coupled and the coupling body 4. The compression of the air seal 7 forms a gastight seal and also insures firm frictional interlocking engagement between the parts being coupled. The compression of the resilient bonding springs 8 results in a positive electrical bond between the coaxial lines and the coupling body.

The gas seal 7 prevents the escape of air or gas with which the transmission line may be charged. The physical dimensions of the coupling are maintained relatively small in comparison with the dimensions of the coaxial transmission lines being joined, thereby enabling the use of such coupling in restricted areas. The coupling process does not require soldering, welding or brazing and can be quickly used to join two coaxial lines without the use of skilled labor or any tools other than a spanner wrench. The coupling is relatively light in weight and is easily replaced in the event of casualty to the transmission line.

While a connection between specific types of coaxials has been shown, it is obvious that the coupling shown and described may be used to join any type of cylindrical coaxials where a gastight joint of high electrical conductivity is desired.

It is to be understood that various modifications and changes can be made in the above described devices without departing from the spirit and scope of this invention as set forth in the appended claims.

The invention described herein may be manufactured and used by or for the Government of the United States of America for governmental purposes without the payment of any royalties thereon or therefor.

What is claimed is:

1. A coupling device for joining transmission lines, comprising a sleeve for slidably receiving an end of a transmission line to be joined, the transmission line and said sleeve having aligned axial bores of substantially equal inner diameters, whereby smooth electrical continuity between said sleeve and the transmission line is ensured, an enlarged recess in each end of the sleeve terminating in a tapered shoulder, a clamping device threadingly engaged in said recess, a bearing ring abutting said clamping device and having a conical seating face, said tapered shoulder and bearing ring in cooperation with the transmission line defining an annular chamber in said recess, a resilient gas-impervious seal and a resilient electrically conducting gasket interposed in said chamber between the conical seat of said bearing ring and the tapered shoulder of said sleeve, whereby actuation of said clamping device expands both said resilient seal and said resilient gasket into tight mechanical and electrical engagement with said sleeve and said transmission line.

2. A connector for interconnecting the outer conductors of a pair of coaxial transmission lines, comprising a tube for receiving the outer conductor to be connected, the inner surfaces of the ends of said tube being of larger diameter than the inner surfaces of the main body of said tube, said enlarged surfaces terminating in shoulders at intermediate points of said tube, said enlarged surfaces being threaded, the outer conductors having bores of inner diameter substantially equal to the diameter of the inner bore of the main body of said tube, thereby to ensure smooth electrical continuity, at the operating frequency, between the outer conductors and said tube, gland nuts received by said threaded surfaces, each of said shoulders having in contact therewith a helically-wound electrical conductor, a resilient ring member, and a cone-shaped bearing member, whereby turning of each of said gland nuts will force said helical conductors, said ring members, and said bearing members against said shoulders and the outer conductors thereby to effect an electrically continuous gastight connection.

HERMAN C. SCHWARTZ.

REFERENCES CITED

The following references are of record in the file of this patent:

UNITED STATES PATENTS

| Number | Name | Date |
|---|---|---|
| 859,813 | Hartmann | July 9, 1907 |
| 1,873,042 | Rohrdanz | Aug. 23, 1932 |
| 1,955,831 | Raybould | Apr. 24, 1934 |
| 2,113,735 | Mascuch | Apr. 12, 1938 |

FOREIGN PATENTS

| Number | Country | Date |
|---|---|---|
| 592,667 | Germany | Feb. 12, 1934 |
| 770,564 | France | July 2, 1934 |